Dec. 15, 1964    R. J. MALCHODI    3,161,272
SELF-ENERGIZING CLUTCH
Filed May 3, 1962    3 Sheets-Sheet 1

INVENTOR.
ROBERT J. MALCHODI
BY
S. J. Rotondi, A. D. Dupont & S. Dubroff
ATTORNEYS.

Dec. 15, 1964    R. J. MALCHODI    3,161,272
SELF-ENERGIZING CLUTCH
Filed May 3, 1962    3 Sheets-Sheet 2
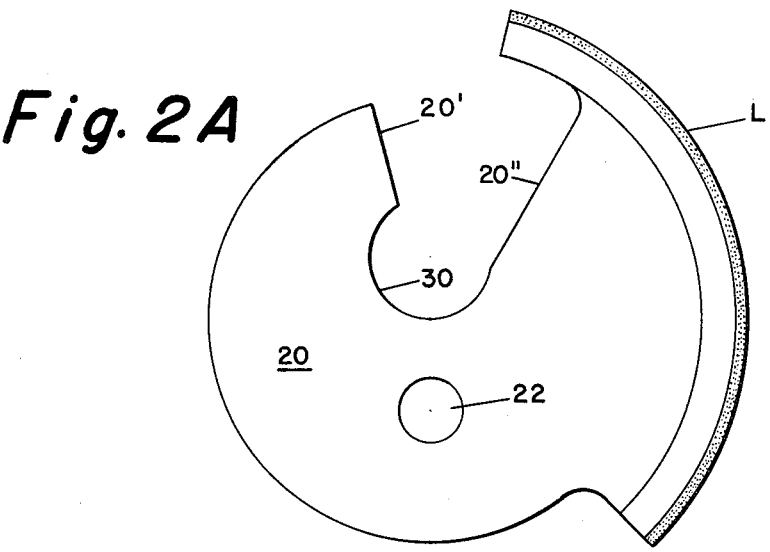
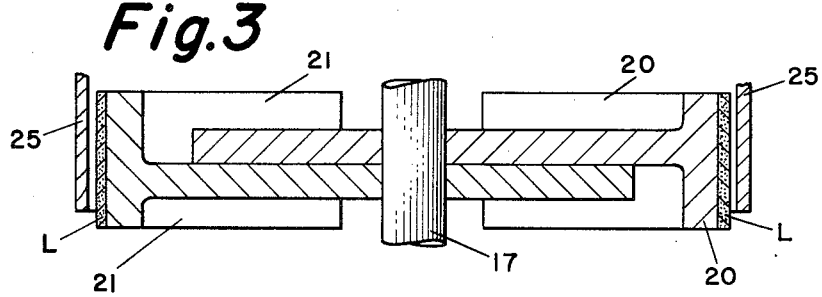
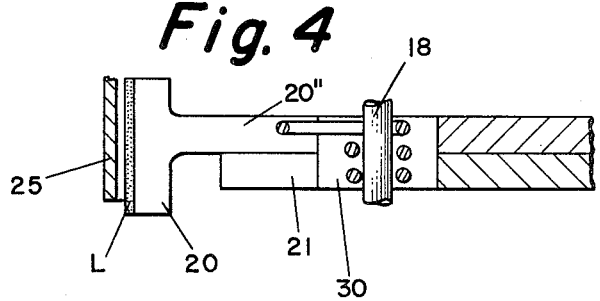
INVENTOR.
ROBERT J. MALCHODI
BY
ATTORNEYS.

Dec. 15, 1964　　　　　R. J. MALCHODI　　　　　3,161,272
SELF-ENERGIZING CLUTCH

Filed May 3, 1962　　　　　　　　　　　　　　　　3 Sheets-Sheet 3

INVENTOR.
ROBERT J. MALCHODI
BY
ATTORNEYS.

3,161,272
SELF-ENERGIZING CLUTCH
Robert J. Malchodi, Baltimore, Md., assignor, by mesne assignments, to the United States of America as represented by the Secretary of the Army
Filed May 3, 1962, Ser. No. 192,294
6 Claims. (Cl. 192—74)

This invention relates to a clutch mechanism and more particularly concerns such a device which is self-energized upon rotation of the power drive shaft and releasable by solenoid action.

In applications such as aircraft canopy removing and the like, clutches of the magnetic or friction type are used to the near-exclusion of others. Commercial magnetic clutches are generally excessively large for the space limitations provided for such devices while the friction type requires greater forces to render them operable than desirable. Neither condition is expedient in today's aircraft.

Accordingly, it is a broad object of my invention to provide a clutch which overcomes these disadvantages.

Another object of the invention is to provide a clutch readily adaptable to such applications as aircraft canopy removing and the like and yet is small in size, light in weight and reliable in operation.

Still another object of the invention is to provide a clutch which is completely self-energizable and releasable upon solenoid actuation.

The exact nature of this invention as well as other objects and advanages thereof will be readily apparent from consideration of the following specification relating to the annexed drawings wherein like reference numerals designate like parts throughout the figures and wherein:

FIG. 2a is a plan view of one of the two shoe assemblies shown in FIG. 2.

FIG. 3 is a sectional elevation taken substantially along line 3—3 of FIG. 2.

FIG. 4 is substantially a section taken on line 4—4 of FIG. 2 with the cam omitted.

Figure 1:
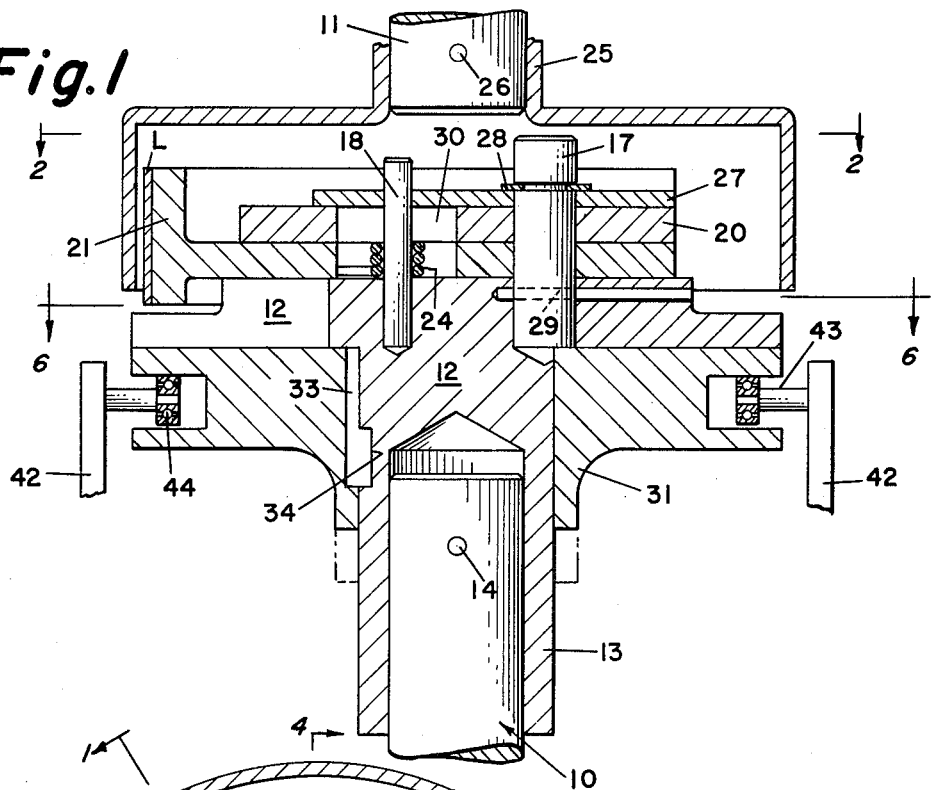
FIG. 1 is a vertical sectional view taken substantially along line 1—1 of FIG. 2 and showing a preferred form of my invention, the cam being omitted for purposes of clarity.
Figure 5:
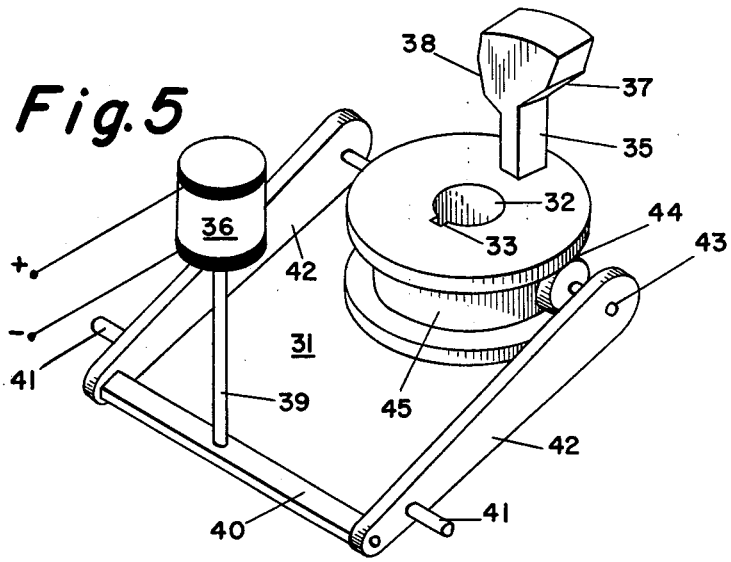
Figure 6:
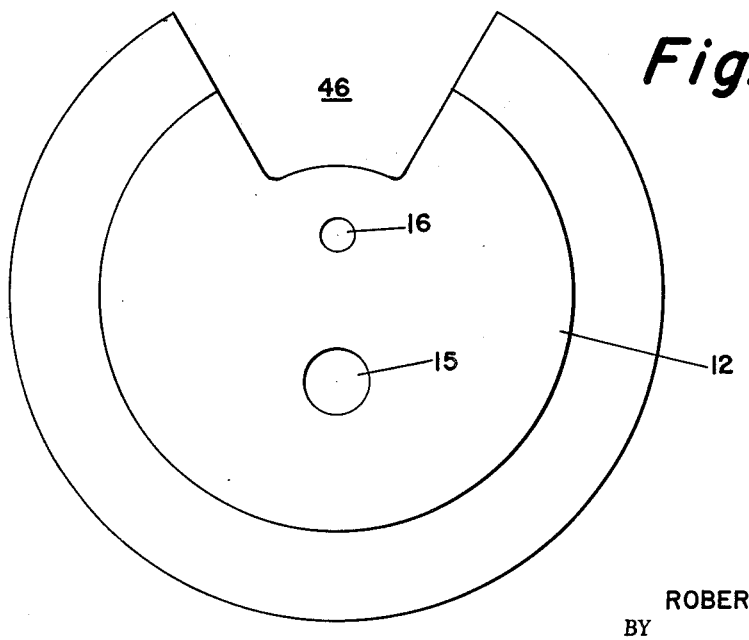

FIG. 5 is a perspective view of the slide and cam arrangement of my invention; and FIG. 6 is a plan view of the hub of my clutch taken along line 6—6 of FIG. 1 with pins 17 and 18 removed.

Figure 2:
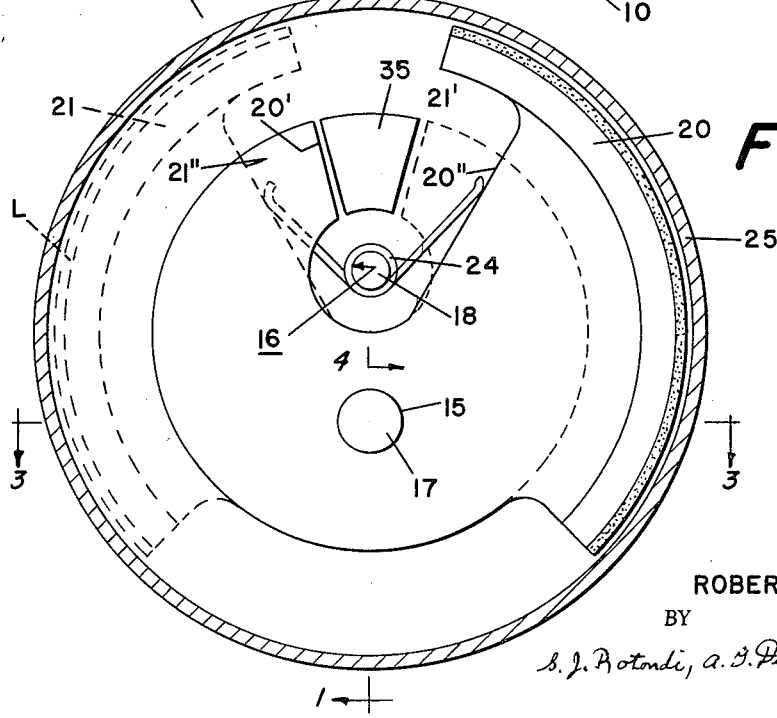
FIG. 2 is a section substantially along line 2—2 of FIG. 1, one of the clutch shoe assemblies being shown in phantom lines and the backup plate, drum and output shaft omitted for purposes of clarity of illustration.

Referring now to the drawings and more particularly to FIG. 1 thereof, there is shown an input shaft 10 which will be connected to a motor and gear boxes (not shown) and an output shaft 11 operable with a jack screw for elevating the canopy, also not shown. The clutch of my invention is generally interposable between these shafts and comprises a hub member 12 having a collar 13 secured to the input shaft by set screw 14. The hub is provided with an off-center pivot bore 15 and a smaller bore 16 for receiving a pivot pin 17 and a spring pin 18 respectively. Pin 17 is frictionally fitted within off-center hole 15 and pivotally mounts a pair of shoes 20 and 21. Each shoe is provided with an off-center pivot hole 22 (FIG. 2a) for receiving pivot pin 17, the shoes being rotatable around this pin. The shoes are identical in shape and will be arranged as shown in FIG. 2 of the drawings such that their cam-actuated faces 20' and 21' are in opposed face-to-face relation and in the same plane. In order to achieve this arrangement it will be apparent that one shoe must necessarily be inverted on pin 17. Additionally, each shoe has cemented therewith a friction material lining as indicated at L, the shoes additionally being provided with a generally flat spring-actuated surface 20'' and 21'' on shoes 20 and 21 respectively, against which a torsion spring 24 bears, the spring being carried by spring pin 18. The pressure exerted by spring 24 against the shoes 20 and 21 causes one of the shoes to frictionally engage a drum 25 secured to output shaft 11 by set screw 26, the drum being concentrically proximately disposed about the shoes. Depending upon the direction of rotation of input shaft 10 which rotates the off-centrally mounted shoes, either the lining L of shoe 20 or 21 will frictionally engage the drum to cause its rotation. More specifically, if the shoes are rotating clockwise in FIG. 2, looking down on the device, the upper portions of the lining of shoe 20 will be centrifugally displaced by virtue of its off-centered arrangement to thereby engage the drum and cause rotation of the drum. Similarly, if the shoes are rotating counterclockwise, the lining of shoe 21 will engage the drum to cause its rotation.

Referring again to FIG. 1, pivot pin 17 and spring pin 18 are supported in hub 12 and are fitted at their upper portions with a clutch plate or back-up plate 27. Spring pin 18 will be force fitted into bore 16 of hub 12 while pivot pin 17 is prevented from escaping the hub by a pin 29 extending transversely of the hub and through the pin 17. Snap ring 28 serves to maintain shoes 21, 20 and the plate 27 operably connected to pin 17.

In FIGS. 3 and 4, the configuration of the shoes are clearly illustrated, the latter figure showing the spatial relationship between torsion spring 24 and surface 20'' of shoe 20 obtained by means of a generally circular hole 30 generally centrally of the shoes (FIG. 2a).

In FIG. 5, a slide 31 provides a central passage 32 axially therethrough for receiving collar 13 of hub 12, the slide being caused to rotate with the hub by means comprising an elongate keyway 33 provided in passage 32, another keyway 34 (FIG. 1) in collar 13 and a key member insertable therebetween (not shown). Extending upwardly from slide 31 is a cam 35 such that, upon actuation of a solenoid 36, the entire slide assembly and the cam is depressed as an entity, the downwardly converging surfaces 37 and 38 of cam 35 being wedged into shoe faces 20' and 21' to retract the shoes against the force exerted by torsion spring 24, and releasing or disengaging the clutch.

Specifically, the downward movement of the slide is responsive to the actuation of solenoid 36, held immovable to a casting (not shown) which will surround the entire clutch mechanism, to cause plunger 39 and a cross bar 40 to move upwardly. The outer ends of a pair of pivot links 41—41 are similarly secured to the aforementioned casting, their inner ends being pivotally mounted to lever arms 42—42. The arms 42—42 pivotally interconnect the cross bar 40 and slide 31 through a second pair of pivot links 43—43 which also serve as slide guides by having their inner ends provided with bearings 44—44 which ride within a grooved annulus 45 disposed generally centrally transversely of the slide 31. It is apparent therefore, since pivot links 41—41 and solenoid 36 are held fast to the casting, that any vertical movement of plunger 39 will produce a generally opposite directional movement in slide 31.

As clearly illustrated in FIG. 6 of the drawings, hub 12 is provided with a cut-away portion 46 to permit free downward movement of cam 35 (FIG. 5) such that its cam faces 37 and 38 may bear against surfaces 20' and 21' of the shoes.

In the operation of my inventive self-energizable clutch mechanism, any rotation of the input power shaft will cause the hub, slide and cam to rotate therewith. The shoes are capable of being rotated around the pivot pin by virtue of a non-tight fit therebetween and the off-centered arrangement. Were the pivot pin to be centrally disposed, it is apparent then that the pin could rotate without imparting the desired motion to the shoes. However, by my novel off-centered arrangement, the shoes will be caused to swing or rotate around the pivot pin in a direction in which the hub rotates. As aforementioned, one of the shoe's linings will then frictionally engage the drum. Release of the device is occasioned by the simple actuation of the solenoid.

From the foregoing description it is apparent that I have provided a clutch which is self-energizable and which can be made releasable upon the expenditure of a minimum amount of power. The parts are so arranged to form a compact unitary device requiring no heavy parts. The axially off-set cam member is of insufficient weight to produce imbalance of the device, and further, the self-energizable and releasable features of my clutch is equally operable irrespective of the direction of rotation of the input shaft.

I claim:

1. A self-energizable clutch device comprising in combination with a rotating input power shaft and an output shaft, a hub secured to and mounted centrally above said input shaft and including a first bore and an off-center bore, a pair of identical shoes disposed in inverted relation above said hub and providing a pair of opposed cam-actuated surfaces and a pair of spring-actuated surfaces, each of said shoes additionally providing a first hole aligned with and of larger diameter than said first hub bore and an off-center hole aligned with said off-center hub bore, a drum affixed to the output shaft concentrically proximately arranged about said shoes, a spring pin snug within said first hub bore and extending upwardly of each of said first shoe holes, a pivot snugly disposed in said off-center hub bore and extending upwardly of said off-center shoe holes, a spring around the spring pin disposed generally in said first shoe holes, said spring exerting pressure against the spring-actuated surfaces of each of said shoes for urging one of said shoes outwardly to engage said drum upon rotation of the input shaft, a slide secured to said hub generally axially therebelow for rotation therewith, a cam fixed to and extending upwardly adjacent the outer periphery of said slide, said cam providing a pair of downwardly converging faces, means for imparting vertical movement to said slide whereby a downward movement thereof will cause said cam faces to wedge against said shoe cam-actuated surfaces to disengage said shoe engaged against said drum.

2. The device as described in claim 1 further characterized by said hub having a cut-away portion adjacent its outer periphery to permit the passage of said cam freely therethrough.

3. The device of claim 1 further characterized by a friction material lining cemented to the outermost portions of each of said shoes.

4. The device of claim 1 further characterized by a plate member disposed over said shoes, said plate being provided with mating holes for axially receiving said spring pin and said pivot pin.

5. The device of claim 1 wherein said means for imparting vertical movement to said slide comprises a solenoid and lever arms articulating between said plunger and slide.

6. The device of claim 5 further characterized by said slide having a transverse grooved annulus generally intermediate its ends, and said lever arms having cooperating pivot links which include a bearing end slidable within said annulus.

References Cited by the Examiner
UNITED STATES PATENTS
658,520   9/00   Abel ------------------ 192—52

DAVID J. WILLIAMOWSKY, *Primary Examiner.*
FRANK SUSKO, *Examiner.*